Figure 1:
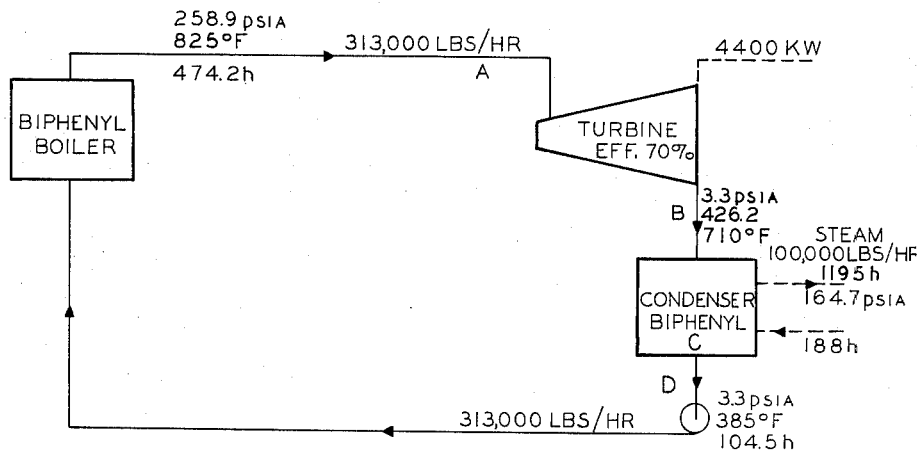

LEGEND
h - ENTHALPY (Btu/LB)
—— BIPHENYL
— — STEAM-WATER CYCLE

JOHN R. BUSS
MALCOLM McEWEN
RAYMOND E. DOERR
INVENTORS

BY *Herman O. Baumeister*
ATTORNEY

Feb. 15, 1966  J. R. BUSS ET AL  3,234,734
POWER GENERATION
Filed June 25, 1962  12 Sheets-Sheet 2

Legend:
h - Enthalpy
—— Biphenyl
------ Steam (water cycle)

INVENTORS
John R. Buss
Malcolm McEwen
Raymond E. Doerr
BY
Herman O. Bauermeister
LAWYER Feb. 15, 1966  J. R. BUSS ET AL  3,234,734
POWER GENERATION
Filed June 25, 1962  12 Sheets-Sheet 4

JOHN R. BUSS
MALCOLM McEWEN
RAYMOND E DOERR
INVENTORS

BY Herman O. Bauermeister
attorney

JOHN R. BUSS
MALCOLM McEWEN
RAYMOND E. DOERR
INVENTORS

INVENTORS
John R. Buss
Malcolm McEwen
Raymond E. Doerr
BY

*Herman O. Bauermeister*

LAWYER

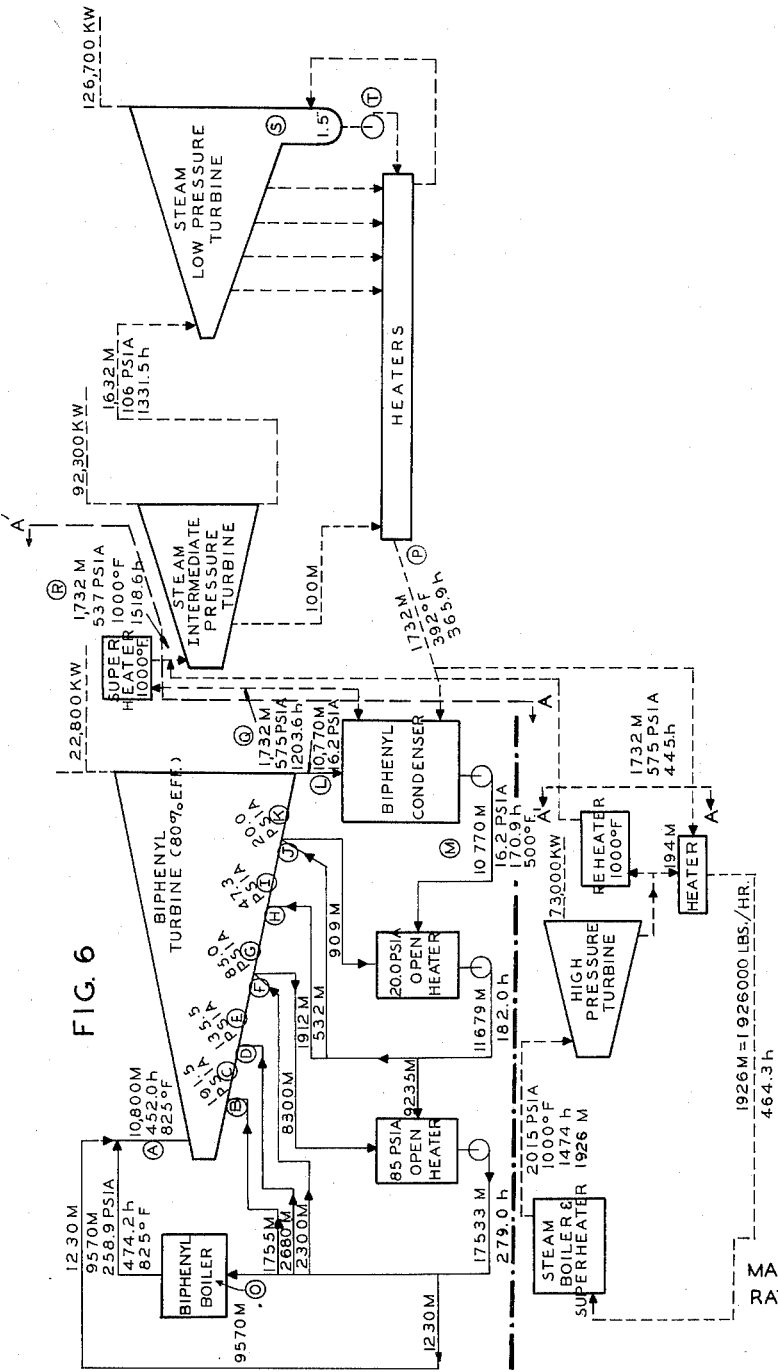

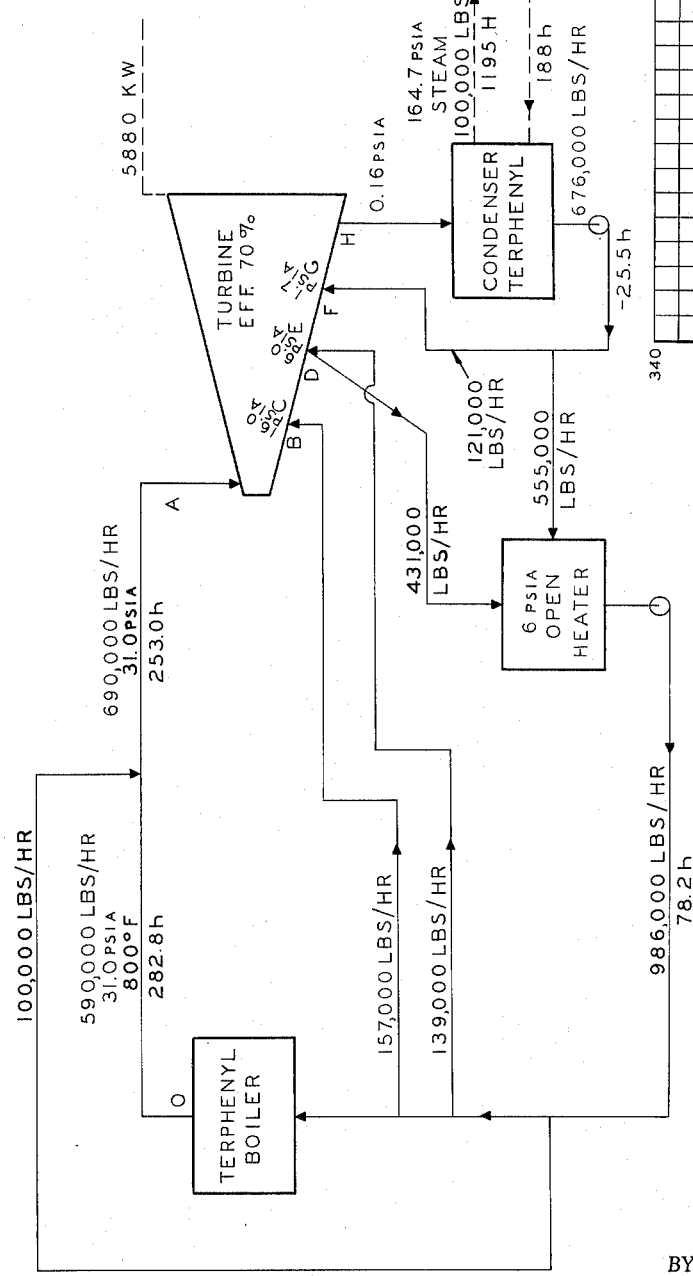
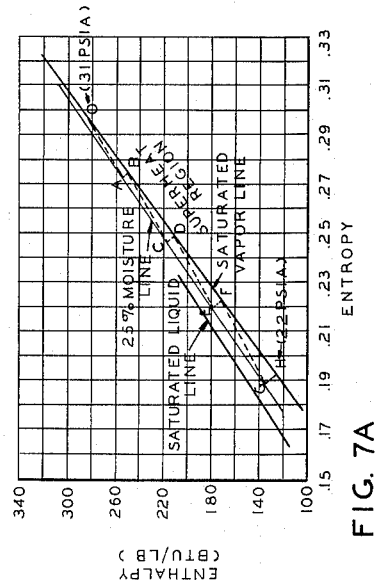
FIG. 7
FIG. 7A
JOHN R. BUSS
MALCOLM MC EWEN
RAYMOND E. DOERR
INVENTORS
BY Herman O. Bauermeister
ATTORNEY

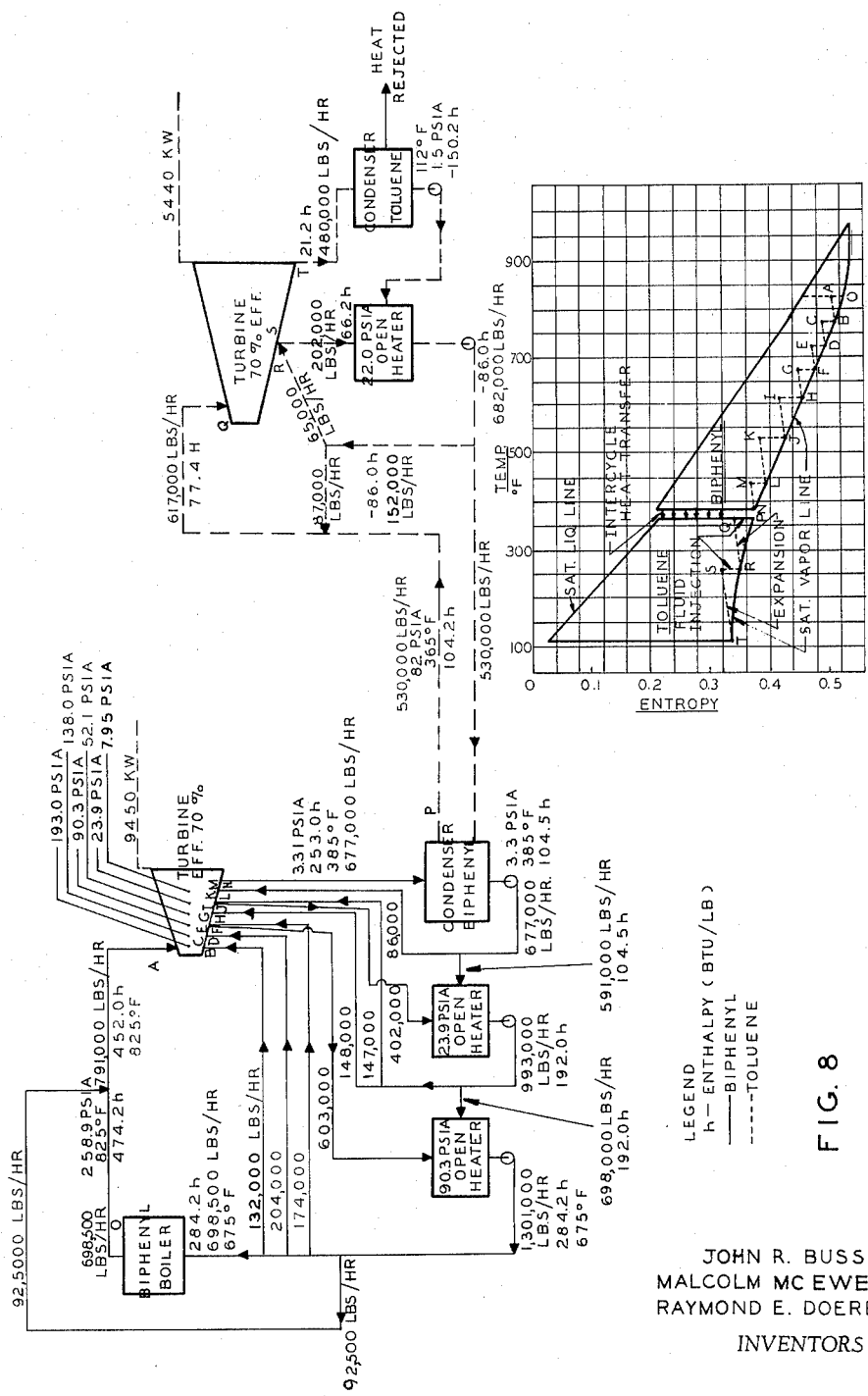

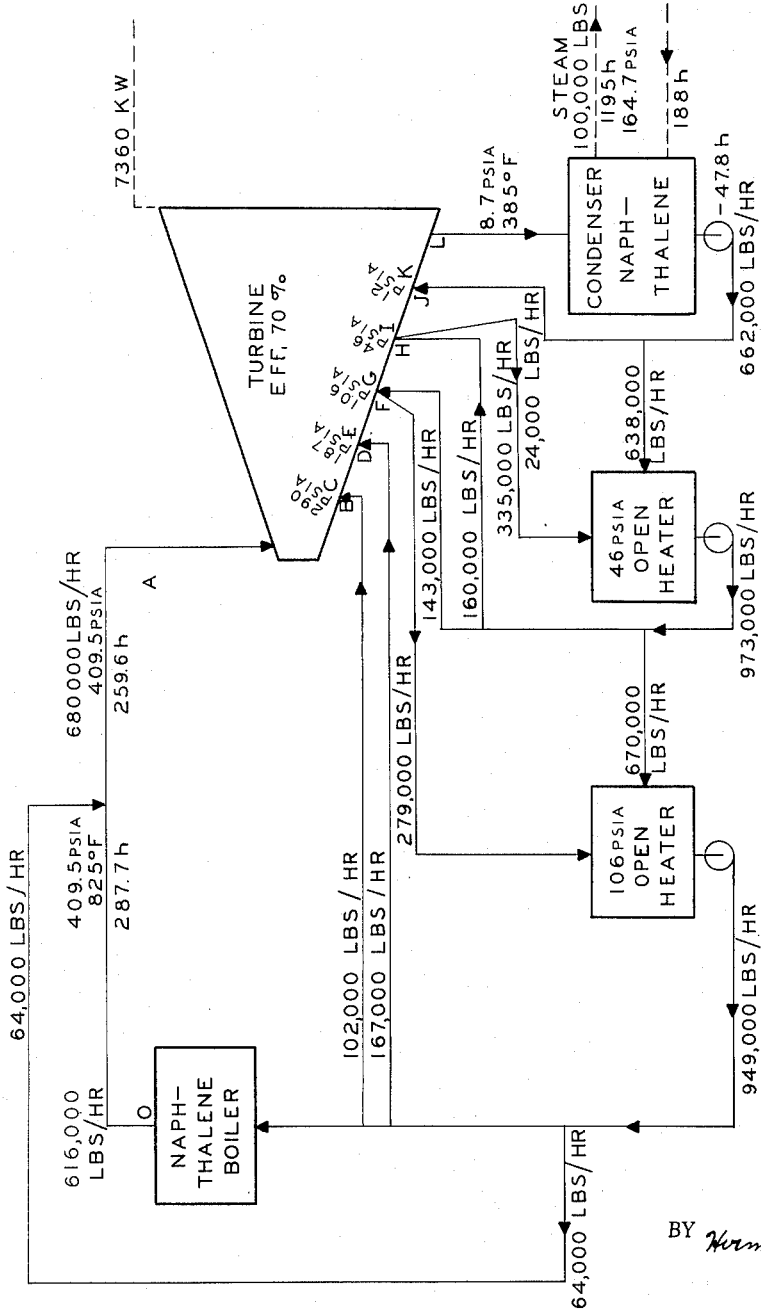
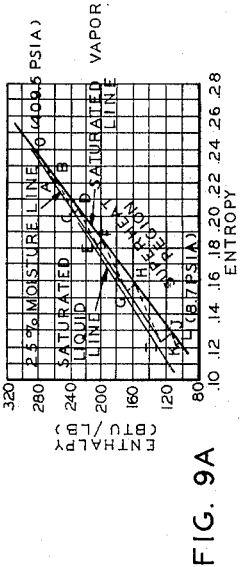
FIG. 9
FIG. 9A
JOHN R. BUSS
MALCOLM MCEWEN
RAYMOND E. DOERR
INVENTORS
BY *Herman O. Bauermeister*
ATTORNEY Feb. 15, 1966 J. R. BUSS ET AL 3,234,734
POWER GENERATION
Filed June 25, 1962 12 Sheets-Sheet 11

INVENTORS
John R. Buss
Malcolm Mc Ewen
Raymond E. Doerr
BY
Herman O. Bauermeister
LAWYER Feb. 15, 1966 J. R. BUSS ET AL 3,234,734
POWER GENERATION
Filed June 25, 1962 12 Sheets-Sheet 12

SECTION A

JOHN R. BUSS
MALCOLM M. McEWEN
RAYMOND E. DOERR
INVENTORS

BY Herman O. Bauermeister

ATTORNEY

United States Patent Office 3,234,734
Patented Feb. 15, 1966

3,234,734
POWER GENERATION
John R. Buss, Malcolm McEwen, and Raymond E. Doerr, St. Louis, Mo., assignors to Monsanto Company, a corporation of Delaware
Filed June 25, 1962, Ser. No. 204,866
27 Claims. (Cl. 60—36)

The present invention relates to an improved process for converting heat into work, such as for the generation of power by imparting energy to an expansion engine such as a turbine or reciprocating engine. It is an object of the invention to convert thermal energy into mechanical energy by generating reciprocating or rotative shaft power for the production of electricity or for application to various mechanical devices such as pumps, compressors, etc.

It is an object of the invention to derive power from a fluid by the direct expansion of the heated working fluid, with such process occurring in a turbine or other fluid expansion machine for the conversion of thermal energy to rotating or reciprocating motion.

It is a further object of the invention to carry out the present power conversion process with a working fluid which superheats upon expansion in the vapor phase. Such materials are characterized upon a Mollier diagram with the entropy as the abscissa and the enthalpy as the ordinate, in having a saturated vapor line with a positive slope. Another characterization of such working fluids is that the superheat region of the entropy-enthalpy diagram occurs at least partly below the saturated vapor line. Examples of such working fluids include binphenyl, terphenyl, toluene and naphthalene. Mixtures of the above described groups of fluids are also contemplated in the present invention including combinations of biphenyl with biphenyl oxide such as the eutectic mixture. Other materials suitable for use in the present invention include: naphthalene, diphenylether, n-dodecane, phenylcyclohexane, bicyclohexyl, perfluorobiphenyl, 4-methylbiphenyl, 4-ethylbiphenyl, 4-isopropylbiphenyl, p-terphenyl, triphenylene, diphenylsulfone, quinoline, dibenzofurane, 3-phenylpyridine, benzophenone, benzene, carbon tetrachloride, Freon 11 ($CCl_3F$), phenol, toluene, hexachlorobenzene, chlorobenzene, hexafluorobenzene, fluorobenzene, aniline, trifluorotoluene, pyridene, thiophene, hexachloroethane, cyclohexane, trifluorobenzene, hexafluorobenzene, hexane, trichloroethane, hexachlorobutadiene, perfluoro-n-tridecane, n-tridecane, thionaphthene, furan, piperidine, pyrrolidine, tetrahydrothiophene, benzofuran, indole, sulfur, 4-chlorobiphenyl, diphenylsulfide, 2,4,6-trimethyl-1,3,5-triazine, cyanuric chloride, cyanuric fluoride, tetramethyl urea, 2-methyl thiophene, 2,5-dichlorothiophene, cyclopentane, perfluorocyclopentane, morpholine, triphenylamine, phenylhydrazine, benzonitrile, tetrachlorothiophene, perfluoro(o-dimethylcyclohexane), dibenzothiophene and bromobenzene, as typical materials.

The present group of working fluids having a positive-slope, saturated vapor line on the entropy-enthalpy diagram, e.g., which superheat upon expansion in the vapor state, differ radically from conventional power generating materials such as steam. It has been widely recognized in the electrical utility and steam generating fields that water is far from ideal as the working fluid for high temperature power cycles. The use of constantly increasing temperatures and pressures for large installations has required the use of extremely expensive alloy steels in the superheater tubes, and the unusually expensive austenitic steels in steam lines between the boiler and the turbine. Furthermore, the use of high steam temperatures of the order of 1000° F. has required extremely expensive, creep resistant alloy steels in the turbine. The present invention in making it possible to achieve high power output, with lower pressures than herebefore possible particularly when operating with liquid injection at some or all of the stages of a turbine greatly reduce the cost of power production equipment.

In the practice of the present invention for the transformation of the thermal energy of the working fluid to mechanical energy in an expansion engine, it is essential that at least one stage of the expansion be conducted with the direct injection of a liquid form of the working fluid. Thus, a single stage of expansion may be used with the liquid working medium being fed to a turbine or expansion engine such as the conventional type of reciprocating steam engine, and the liquid vaporizing or flashing to the vapor state.

In other embodiments of the invention, the primary stage of expansion may begin with either liquid and/or vapor working fluid, but with subsequent injection at one or more stages of the working fluid being in the liquid condition.

In one embodiment of the invention the working fluid which is to be expanded is subjected to multiple injection in a turbine or expansion engine. In this manner of practicing the invention, the additional fluid which is applied at various turbine stages, or between the respective expansion cylinders of an expansion engine, is applied with at least some liquid present, preferably with the major portion being liquid. This liquid mixes with any vapor already present and the total mixture expands substantially to the saturated vapor state. A preferred, but not limitative condition is less than 50° F. of superheat or less than 20% by weight of liquid being present after the expansion. In practicing the invention, the original charge of working fluid to the turbine or to the expansion engine preferably contains a mixture of liquid and vapor, although the use of vapor in the initial charge is also feasible. For example a biphenyl boiler may discharge vapor at saturated conditions at 258.9 p.s.i.a. and 825° F. to a turbine in which the expansion of this biphenyl vapor results in superheating. Consequently, it is desirable in this instance to inject additional biphenyl in the form of liquid at an intermediate point or points in the turbine in order to minimize superheat upon further expansion of the mixture. The further expansion through the turbine of the biphenyl mixture is to 3.3 p.s.i.a. and at 385° F. instead of 710° F. at the same exhaust pressure which would exist without the liquid injection.

The above case shows the essential requirement that there be at least one direct charge of a liquid working fluid to the prime mover such as a turbine or steam engine. Such charging or injection of the heated working liquid makes it possible for the working fluid mixture to expand to the vapor state upon expansion through the prime mover. Inasmuch as the fluids employed in the practice of the present invention undergo superheating upon expansion in the vapor state, it is possible to counteract the superheating tendency of the one stage by the addition of liquid working fluid prior to the expansion of the mixture in that stage.

Another embodiment of the invention is the method of converting heat into work by the expansion of a fluid characterized in superheating upon expansion in the vapor state, and thereafter expanding the said liquid to substantially the saturated vapor state, thus expanding the vapor with a gain in superheat. However this embodiment is also characterized in introducing into the said expansion engine additional quantities of another fluid characterized in superheating upon expansion in the vapor state, with said additional fluid being at least partly in the liquid state, and substantially completely vaporizing the said added fluid in the presence of the first quantity of the first said expanded fluid. As another modification of this embodiment, the process may also include the subsequent condensing of the vapor admixture of the first and second fluids.

Figure 2:
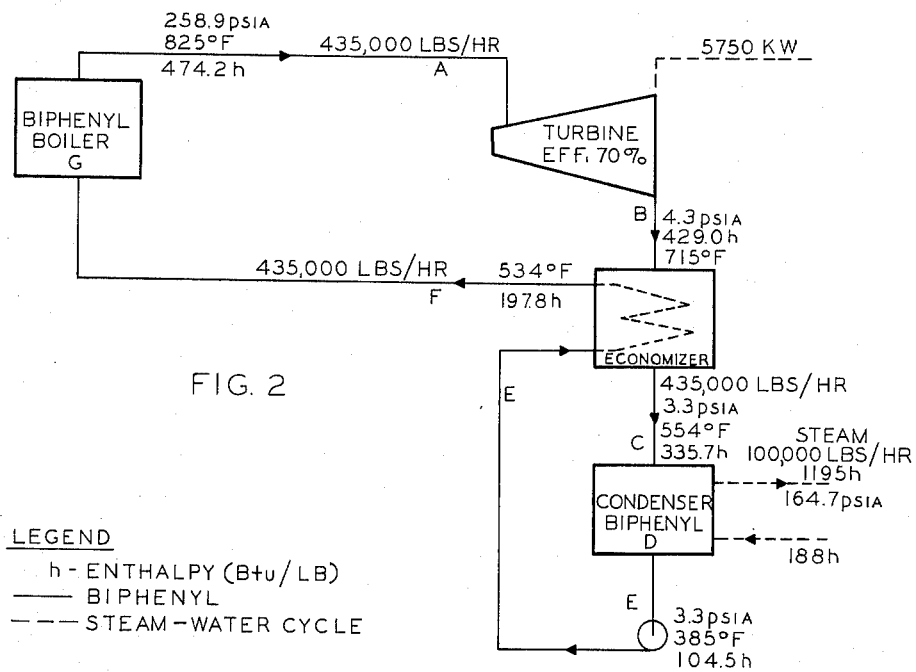
Figure 3A:
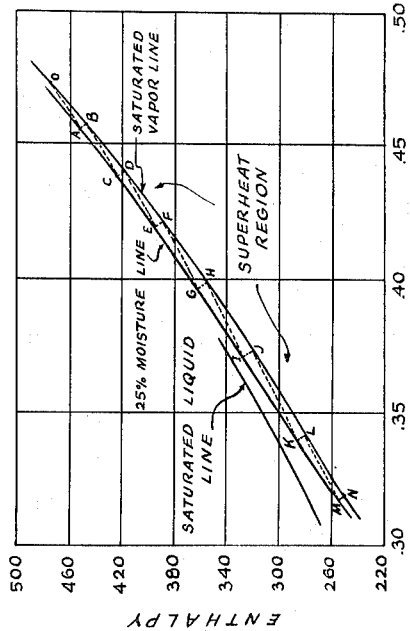
Figure 4A:
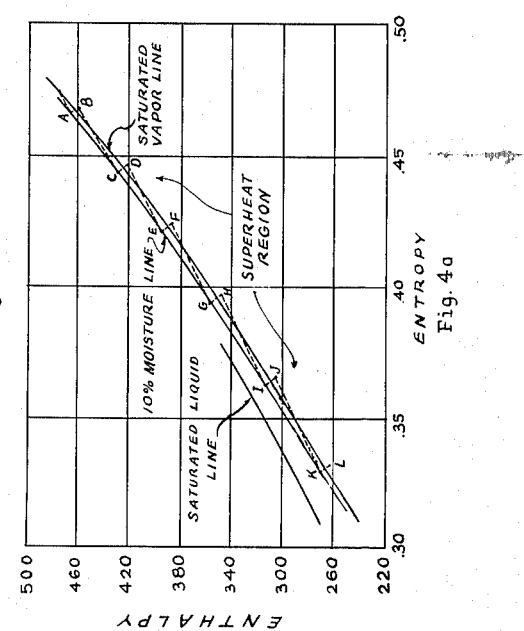
Figure 3:
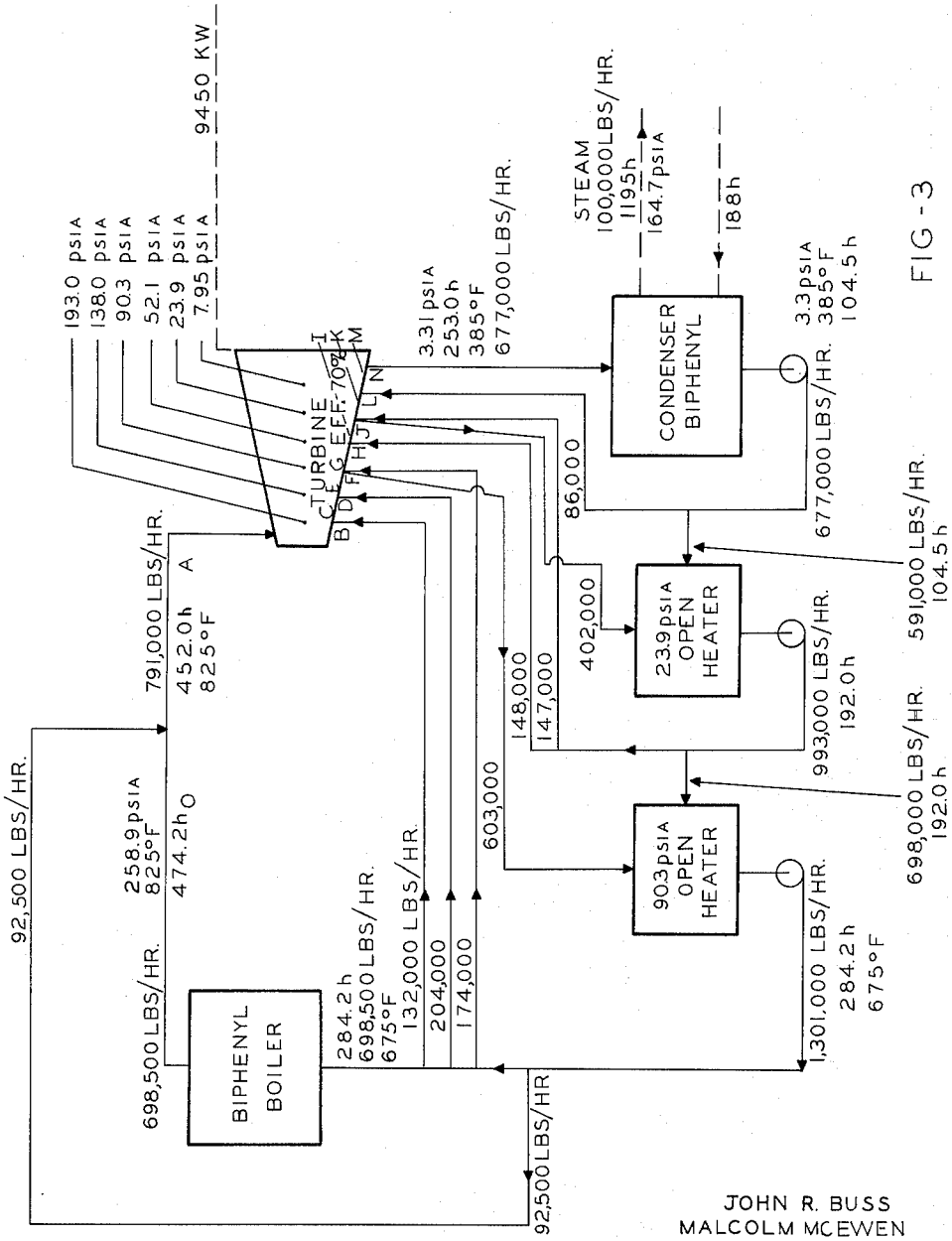
Figure 4:
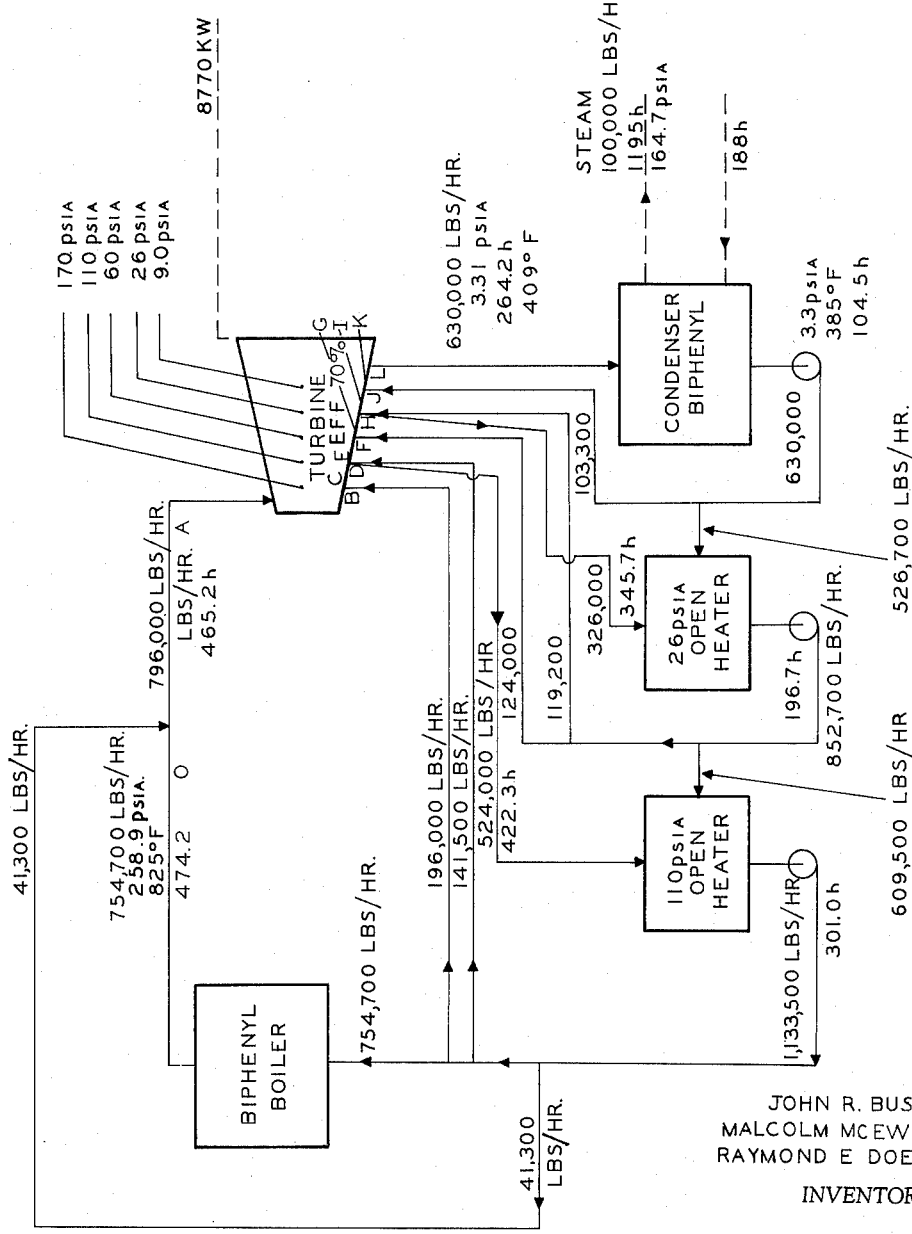
Figure 5:
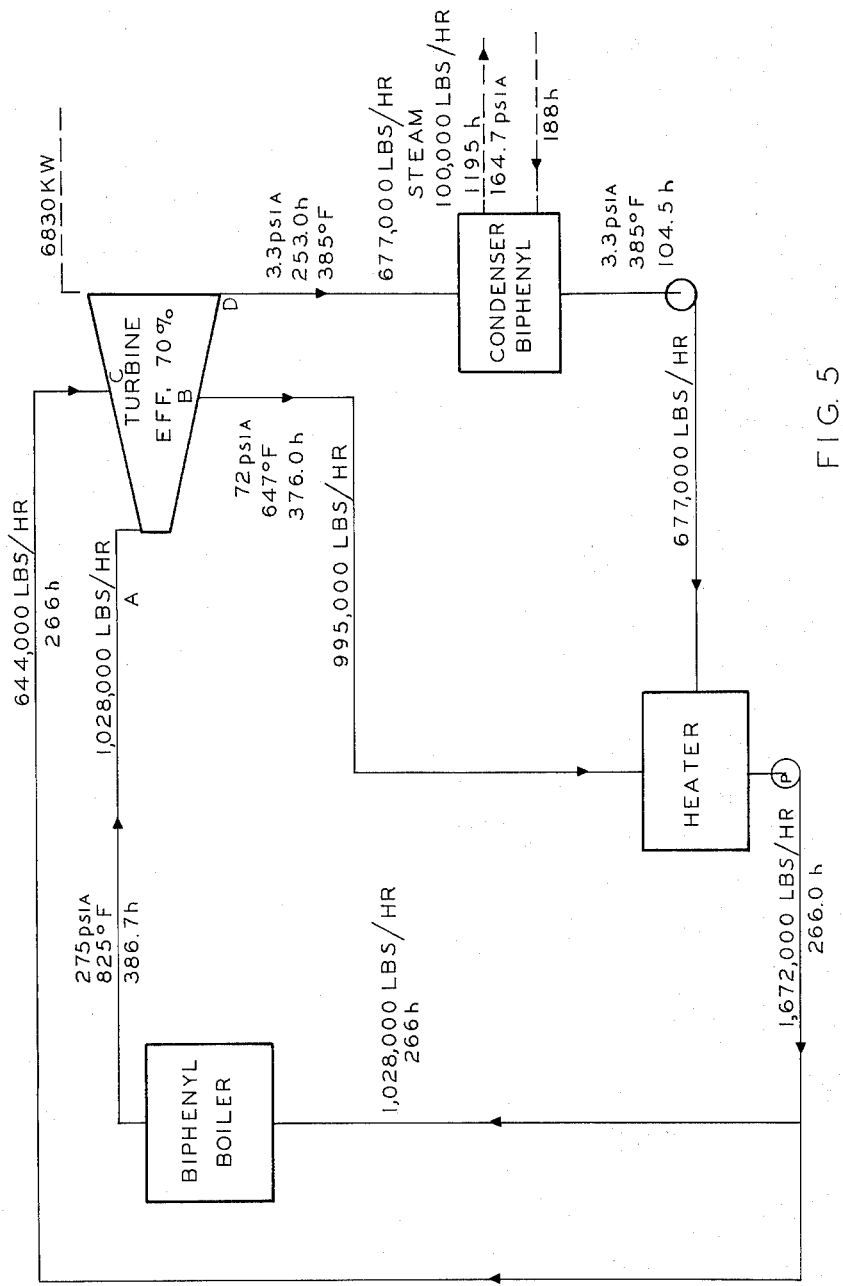

The drawings of the present invention illustrate certain specific embodiments of the invention as illustrations thereof, without, however being limitative of the scope of the invention. In the drawings, FIGURE 1 illustrates the use of biphenyl charged as vapor directly to an expansion turbine. FIGURE 2 shows the use of a similar vapor charging of biphenyl to a turbine together with an exhaust economizer in an industrial plant application. FIGURE 3 shows the use of a biphenyl system utilizing a mixed liquid-vapor charge containing 25% by weight of liquid biphenyl, with additional injections of liquid biphenyl. FIGURE 4 shows the use of biphenyl as a liquid-vapor mixture containing 10% by weight of liquid, with additional multiple injection of liquid. FIGURE 5 shows a biphenyl power system with the primary charge to the turbine being composed of saturated liquid biphenyl and with an intermediate addition of further liquid biphenyl. FIGURE 6 shows a power production system using a binary cycle with the first fluid consisting of biphenyl charged as a liquid-vapor mixture to an expansion turbine, and with the second fluid being water, heated to steam in the biphenyl condenser, superheated, and expanded through two additional steam turbines.

FIGURE 7 illustrates the use of an alternative fluid in a power production cycle, the said fluid having the characteristics described above of having a Mollier diagram, drawn with the entropy as the abscissa and the enthaply as the ordinate, with the superheat region being at least partly below the saturated vapor line. Such working fluids are also characterized in having the saturated vapor line of the entropy-enthalpy diagram exhibit a positive slope. The specific fluid shown in the heat-work conversion system of FIGURE 7 is terphenyl.

Figure 10:
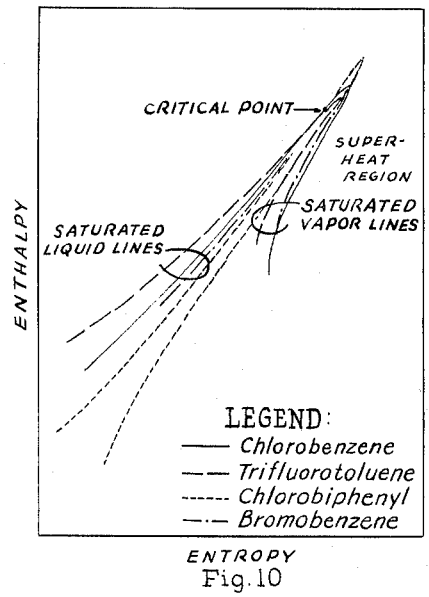
Figure 11:
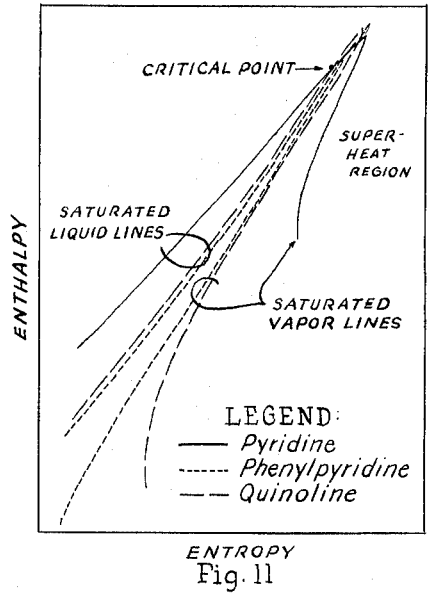
Figure 12:
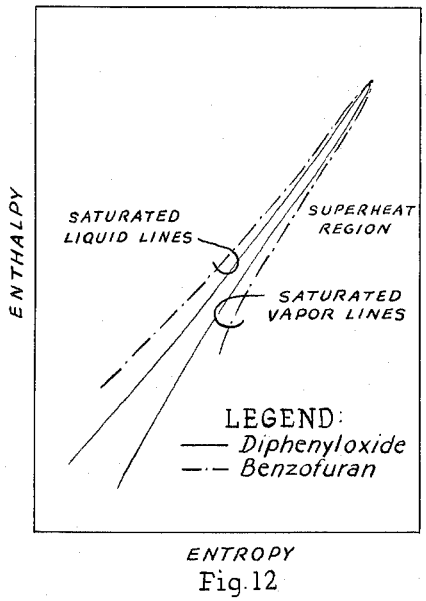
Figure 13:
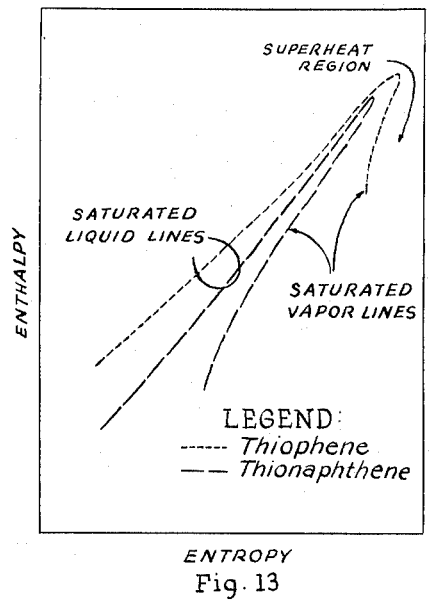

FIGURE 8 shows other working fluids employed for the process of the present invention, namely, toluene and biphenyl in a binary cycle. FIGURE 9 shows still another fluid having the above described thermodynamic characteristics, namely, naphthalene. FIGURES 10, 11, 12 and 13 show the thermodynamic representation on Mollier diagrams (entropy as the abscissa and enthalpy as the ordinate) of additional working fluids useful in the practice of the present invention. FIGURE 10 shows the saturated liquid lines and saturated vapor lines for a number of halogen substituted materials while FIGURE 11 shows a number of nitrogen substituted compounds. FIGURE 12 shows representative sulfur containing compounds and FIGURE 13 shows the curves of representative working fluids containing oxygen in the molecule.

Figure 14:
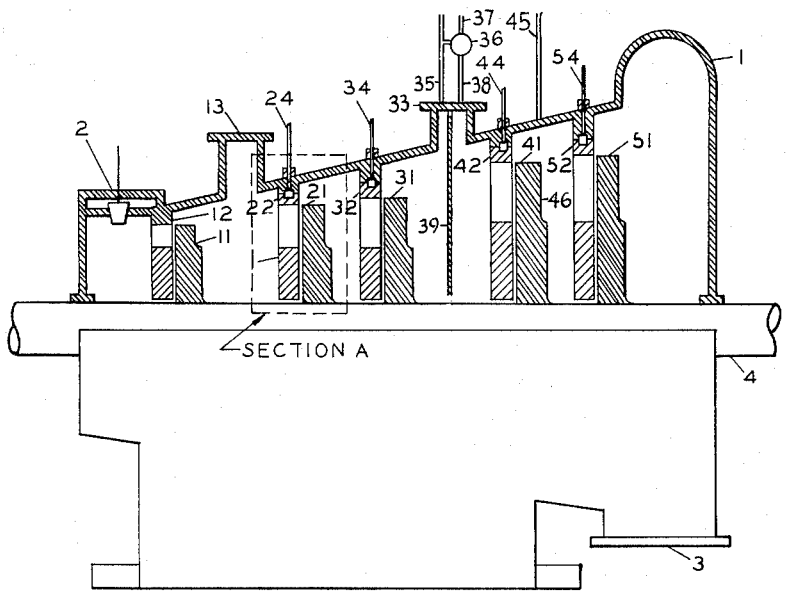
Figure 15:
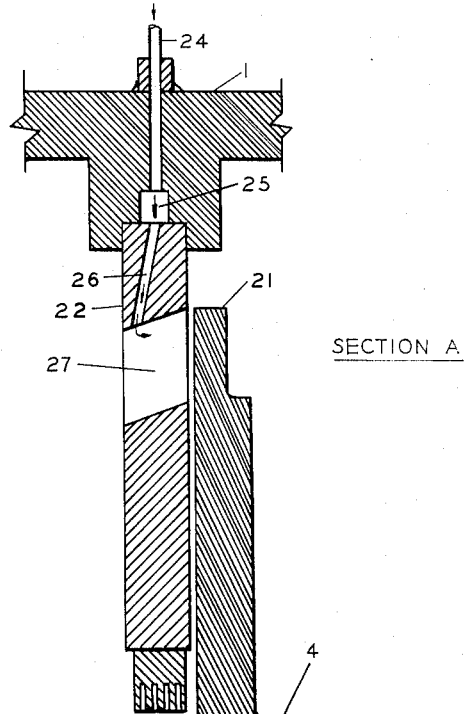

FIGURES 14 and 15 show the mechanical system of an expansion turbine for the introduction of the liquid working fluid as the secondary charge, with the charge to the first stage being either in the liquid, vapor, or mixed state.

The following examples which illustrate the details of carrying out certain of the power cycles are representative, but are not limitative of the present invention.

Examples 1 to 5 show a series of procedures for the use of biphenyl as a typical working fluid of the present invention based upon the use of a material having a Mollier diagram, drawn with the entropy as the abscissa and the enthalpy as the ordinate, and with the superheat region being below the saturated vapor line. Such materials employed in the present processes and with the machines of the present invention can also be characterized as having a saturated vapor line of positive slope on the entropy-enthalpy diagram. In the series of thermodynamic cycles shown in Examples 1 to 5, the objective is to illustrate the production of both steam and electricity in industrial plant systems. The reason a constant plant steam load was chosen as the basis of determining power production for these cycles is because practically all industrial plants consume more power than can be produced from the plant steam load with non-condensing turbines, and condensing turbines require about 3 to 4 times the heat rate (B.t.u./kw.h.) at which by-product power can be produced. The series of thermodynamic cycles representative of the respective methods of operation of Examples 1 to 5, consequently, show the great improvement which results from the use of the present process making it possible to produce larger proportions of electrical power relative to the output of process steam.

The heat source for the provision of the thermal energy which is to be transformed in the practice of the invention can be from any of the conventional sources such as the fossil fuels including coal, oil and gas, as well as nuclear fuels, solar energy, etc.

EXAMPLE 1

Figure 1A:
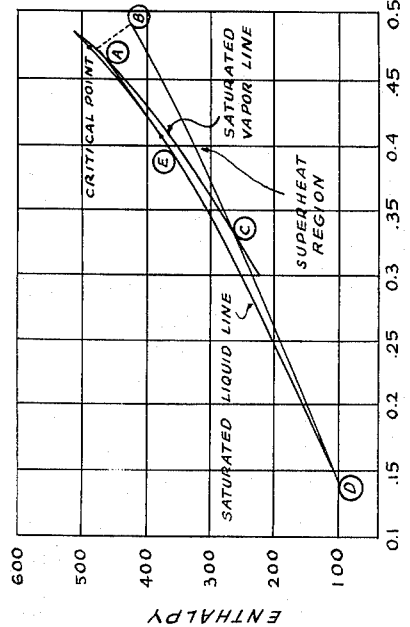

As a comparison against the improved processes of the present invention, the example illustrated in FIGURES 1 and 1A shows the use of biphenyl vapor obtained in a biphenyl boiler and expanded through an expansion turbine. FIGURE 1 illustrates the operating conditions representative of this procedure, with the output being 4400 kilowatts of electric power and with the process steam being produced at the rate of 100,000 lbs. per hour at 164.7 p.s.i.a.

The drawing of FIGURE 1A shows the thermodynamic representation on a Mollier diagram of the expansion of the biphenyl vapor in the turbine. In this drawing, the biphenyl vapor leaving the boiler has the initial condition as represented as point A, which is also indicated on FIGURE 1, with the expansion being carried out between points A and B before desuperheating and condensation takes place, between points B and D.

EXAMPLE 2

This example shows the use of biphenyl charged in vapor form to an expansion turbine but with the additional use of a turbine exhaust economizer to improve the efficiency. In this case, shown in FIGURE 2 with the operating conditions being indicated, 5750 kilowatts of electric power are produced together with 100,000 lbs. per hour of process steam at 164.7 p.s.i.a.

Figure 2A:
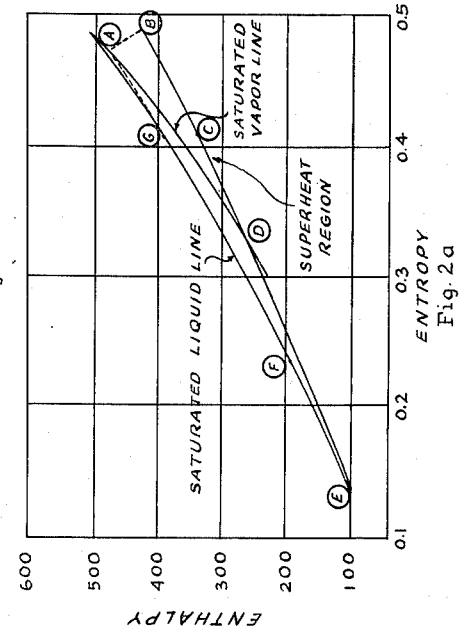

The thermodynamic diagram of FIGURE 2A illustrates the conditions corresponding to the expansion and condensation of the biphenyl in this method of operation.

EXAMPLE 3

As an illustration of the use of a working fluid of the type embraced by the present invention and with the charge from the boiler to the turbine being at least partly in the liquid state, e.g., with 25% by weight of "moisture," this example shows the improvement which is made possible in the practice of the present invention. FIGURES 3 and 3A illustrate the operating conditions with the biphenyl mixture being partly in the liquid state as the charge to the turbine and with six additional intermediate injections of liquid biphenyl being carried out. In practicing this invention with the use of multiple injection, the charge at the respective addition points is introduced at approximately the pressure existing within the turbine as a result of the expansion of the previous charges. Thus by throttling the flow of biphenyl liquid to the turbine at the introduction points, such as in response to a temperature reading of the fluid leaving the stage, the desired conditions of the working fluid leaving the stage is easily maintained. In FIGURE 3, 9450 kw. of power are produced under similar operating conditions to those of FIGURES 1 and 2 above, and with the production of process steam for industrial purposes amounting to 100,000 lbs. per hour at 164.7 p.s.i.a. FIGURE 3A shows the thermodynamic cycle on the biphenyl Mollier diagram.

The system of Example 3 can also be compared with that of Example 2, and a similar water-steam power plant, in the data of Tables I and II. It is seen that the multiple biphenyl turbine injection cycle (Example 3) produces 160% more power than the steam cycle with only 17% more fuel input. In Example 3 the incremental additional gross heat input to the cycle as compared to the steam cycle is all transferred into the production of incremental power.

The attached Table II compares a conventional industrial, extraction-condensing steam turbine cycle with the Example 3 biphenyl cycle. In this table the same quantity of power and steam are produced in both the steam and biphenyl cycles. A large percentage of the power in the steam cycle has to be produced as condensing power. As a result, the steam cycle has to consume about 59% more fuel than Example 3 biphenyl cycle.

*Table I.—Non-condensing power steam vs. biphenyl power cycle in industrial application supplying 100,000 lb./hr. of sat. steam*

| Type installation | Power generation, kw. | Gross boiler fuel input, B.t.u./hr. | Percent increased power generation | Percent increased fuel input |
|---|---|---|---|---|
| Conventional industrial steam power cycle, 650 p.s.i., 750° F | 3,640 | *131×10⁶ | Base | Base |
| Example 3—Improved biphenyl power cycle | 9,450 | *132×10⁶ | 160 | 17 |

*100×10⁶ B.t.u./hr. of the total heat input goes into the production of the 100,000 lbs./hr. of 164.7 p.s.i.a. steam for the plant.

*Table II.—Steam vs. biphenyl power cycle: power and steam loads equal industrial application supplying 100,000 lb./hr. of saturated steam*

| Type installation | Power generation, kw. | Gross boiler fuel input, B.t.u./hr. | Percent increased power generation | Percent increased fuel input |
|---|---|---|---|---|
| Example 3 cycle | 9,450 | *132×10⁶ | Base | Base |
| Conventional industrial extraction condensing steam power cycle 650 p.s.i., 750° F | 9,450 | *210×10⁶ | 0 | 59 |

*100×10⁶ B.t.u./hr. of the total heat input goes into the production of the 100,000 lbs./hr. of 164.7 p.s.i.a. steam for the plant.

EXAMPLE 4

The present example shows a multiple injection turbine in which the initial feed to the turbine from the biphenyl boiler contains 10% by weight of liquid biphenyl or "moisture" with the remainder being in vapor form. The additional biphenyl fed at subsequent injection points in the turbine employ biphenyl in liquid form and is throttled to obtain the necessary flow at such intermediate injection points. In this example the respective expansions of the charges of biphenyl extend to 30° F. to 40° F. of superheat in the respective stages. The present system shown in detail in FIGURE 4 as to operating conditions produces 8770 kw. which is 141% more power produced with the conventional steam cycle as shown in Table I, with only 16% increase in fuel consumption. FIGURE 4A shows the diagram of this thermodynamic cycle.

EXAMPLE 5

Figure 5A:
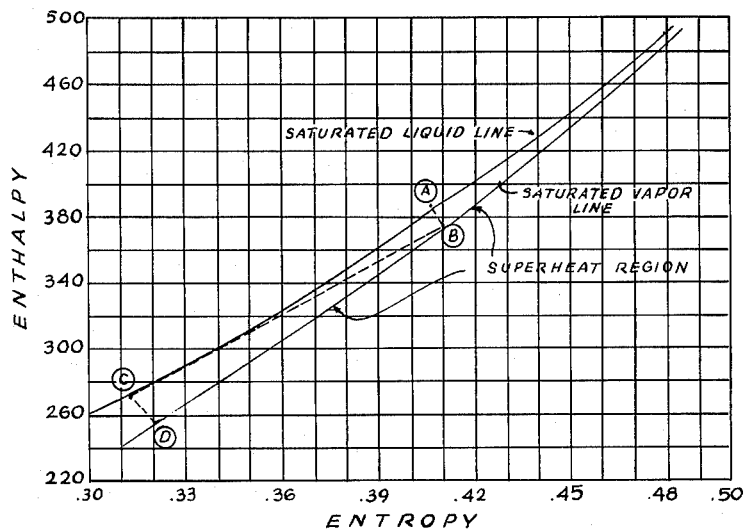

As an application of the use of a completely liquid charge of biphenyl to the turbine of an industrial plant power cycle, the present example shows the operating conditions beginning with the primary feed of biphenyl liquid at 275 p.s.i.a. and at 825° F. There is also an intermediate extraction of expanded vapor to a heater which is used to heat the condensed biphenyl from the condenser. In this example, 6830 kw. of power and 100,000 lbs. per hour of process steam at 164.7 p.s.i.a. is produced with the operating conditions as shown in FIGURE 5. FIGURE 5A shows the thermodynamic cycle.

EXAMPLE 6

The substitution of biphenyl in a central power station cycle in place of the high pressure, high temperature steam boiler and turbine is shown in the present example. Here in the high temperature biphenyl turbine of the topping system, multi-stage biphenyl liquid injection is used comparable to Example 3. The charge from the boiler to the turbine is partly in the liquid state, e.g., 25% by weight of liquid biphenyl. In this binary cycle, steam is generated by the condensing of biphenyl as in the previous examples. However, in this example the steam is superheated and is used to generate additional power with subsequent condensing of the steam by rejecting heat from the cycle. By substituting biphenyl in place of the steam for the high pressure part of the conventional high pressure steam cycle, 17% additional power can be produced with only an 8% increase in gross fuel input.

Figure 6B:
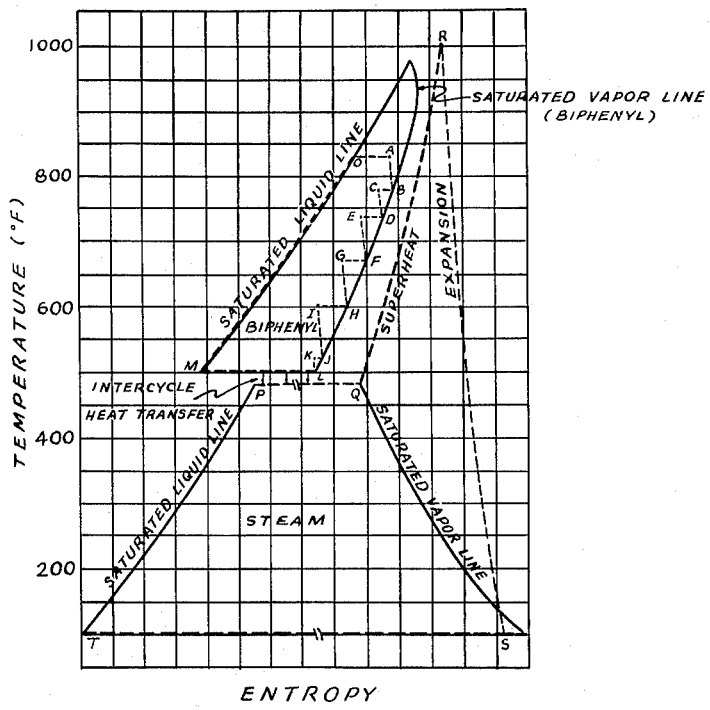

In FIGURE 6 illustrative of the operation of the central station system of Example 6, the primary turbine operates with an input of a mixture of biphenyl liquid and vapor being composed of approximately 25% liquid and 75% vapor. The first stage of expansion of this vapor-liquid mixture is shown as step AB in the first section of the biphenyl turbine of FIGURE 6, such expansion being represented by the step AB on the diagram, 6B of this drawing. The successive injections of saturated liquid biphenyl are indicated on the following diagram of FIGURE 6 and also on the thermodynamic diagram, FIGURE 6B. It is seen that five injections and five stages supplement the first charge employed in the biphenyl turbine. Inasmuch as the objective of a central station or public utility system of this type is not to produce any by-product steam, but instead to make as much electricity as possible, the steam (water) resulting from the condensation of biphenyl is passed to intermediate and low pressure steam turbines, such steam expansion being shown as a general curve on FIGURE 6B.

In order to provide a comparison with a conventional steam power plant representative of the operating conditions of FIGURE 6, there is also shown on this same drawing, FIGURE 6A in which only the first high pressure turbine operating with water as the fluid to charge steam to such turbine is indicated. Since the intermediate and low pressure turbines are identical to those of FIGURE 6, only the high pressure area is illustrated in FIGURE 6A. The relationship of FIGURE 6 is shown by the substitution along line A—A' of FIGURE 6.

In comparing the present example illustrative of the improvement made possible by the use of the present invention in central electric power station practice, it is immediately obvious that the conventional high pressure, high temperature steam boiler requiring extremely expensive materials such as austenitic steels for the steam lines from the boiler to the turbine as well as expensive superheating units have been rendered unnecessary. Instead, the primary biphenyl charge from the boiler to the high temperature turbine requires only a temperature of 825° F. and a pressure of 258.9 p.s.i.a.

EXAMPLE 7

FIGURES 14 and 15 show a turbine which may be used in practicing the present invention based upon charging a stream containing at least some liquid biphenyl to the stages of an expansion turbine system. Specifically the present drawing shows an installation in which the initial charge of biphenyl while being either in the liquid, vapor or mixed condition receives a supplementary charge which is substantially completely liquid.

The primary charge is fed to the turbine by conventional means including the use of distributor rings, grids or diaphragms such as are conventional to obtain equal distribution to the turbine wheels. The supplementary charges of liquid working fluid are introduced after the expansion of the previous charge which had been brought to a condition which is substantially that of saturation, although moderate degrees of superheating, or incomplete expansion with the retention of some liquid is also contemplated. In order to distribute this additional or supplementary charge with the expanded working fluid of the previous stage, the mixing may take place in a mixing channel, or directly by atomizing into the diaphragm nozzles with said diaphragm being secured to the stator or casing of the turbine. Consequently, the complete mixture of fluid from the previous stage, largely being in the vapor condition with the addition of liquid results in still further expansion which occurs in the next set of blades or buckets secured to the rotor of the turbine. If desired, further stages of expansion may also be employed with liquid injection prior to expansion.

In FIGURE 14, a cross section of a turbine illustrates five stages of expansion. In the drawing, element 1 represents the turbine casing with the primary inlet at 2 and the exhaust at 3. The shaft of the turbine is shown as element 4. The sets of turbine blades for the respective stages of expansion are shown as elements 11, 21, 31, 41 and 51. The diaphragms forming a part of each expansion stage are correspondingly indicated as elements 12, 22, 32, 42 and 52, respectively. In order to provide for extraction of expanded vapor following the turbine expansion stages, extraction points 13 and 33 are provided at intermediate points in the turbine casing 1. The use of intermediate injections of working fluid which is at least partly in the liquid state is provided by inlet charging points 24, 34, 44, and 54, respectively.

FIGURE 15 illustrates, in greater detail, a portion of the turbine of FIGURE 4 corresponding to the intermediate stage designated as Section A in FIGURE 14 with corresponding elements having the designations set forth above. It is noted that the incoming charge of working fluid enters by line 24 to pass into casing 1 and then enters a 360° radial distribution channel 25 to provide equal flow into the individual blading elements or nozzles of a diaphragm 22. The diaphragm has a channel 26 from distribution channel 25 to the blading or nozzle section 27 in which mixing takes place between the injected charge, which contains at least some liquid, and preferably is constituted entirely of liquid, and the vapor entering this stage after having expanded in the previous stage.

In practicing the present invention, the mixing of the expanded vapor with the supplementary charge may also take place in an external chamber such as a mixing chamber which then discharges the mixture to the next turbine stage of expansion. This is shown in FIG. 14, where extraction point 33 is provided with pipe 35 for direct withdrawal of expanded vapor. However, the vapor in pipe 35 may alternatively be directed in whole or part to mixing chamber 36 wherein injection fluid enters from pipe 37, mixes with the vapor in 36, and returns to the turbine by pipe 38.

In this region of the turbine, division plate 39 isolates the leaving and returning streams.

The turbine itself may also provide a mixing chamber 46 in FIG. 14 with injection fluid entering from pipe 45 to mix with expanded vapor from turbine buckets 41 prior to entering diaphragm 54.

In the present patent application, the vapor state is considered to refer to a completely gaseous condition, although it is also contemplated that mixed vapor-liquid compositions be used at various parts of the process.

EXAMPLE 8

FIGURES 10, 11, 12 and 13 show the thermodynamic representation on the entropy-enthalpy diagram for additional representative materials suitable for the practice of the present invention in being characterized as having a saturated vapor line with a positive slope on the entropy-enthalpy diagram. FIGURE 10 shows chlorobenzene, trifluorotoluene, chlorobiphenyl, and bromobenzene as representative halogen containing materials. FIGURE 11 gives the similar operating curves for pyridene, phenylpyridene, and quinoline as working fluids which contain nitrogen in the molecule. FIGURE 12 similarly shows thiophene and thionaphthene as representative sulfur containing materials and FIGURE 13 shows the operating curves for the use of biphenyl oxide and benzofuran as representative oxygen containing compounds suitable for use in the practice of the present invention.

It is found that the use of the materials illustrated in FIGURES 10, 11, 12 and 13 in the transformation of heat into work utilizing expansion from the liquid condition of the working fluid similarly to the diagrams shown in FIGURES 7, 7A, 8, 8A, 9 and 9A results in the production of electricity from the rotative power as well as the production of substantial amounts of by-product heat energy. The wide variety of working fluids adaptable to the use of the present process and apparatus based upon the criterion of a saturated vapor line of positive slope on the entropy-enthalpy diagram also makes it possible to operate heat-power systems under unusual circumstances, for example, in operating under the extreme temperature conditions which are found both in arctic and tropical conditions as well as in the conditions of outer space in the power systems of missiles, rockets and space vehicles.

The process of the present invention is extremely useful in complex power cycles such as are used in industrial and central station practice for the conversion of heat energy into work to be used in the generation of electricity and also in various cycles in which by-product steam or other heated vapors are supplied for process heating, saline water conversion and other uses. For example, the use of a fluid of the present invention characterized in having a saturated vapor line of positive slope on the enthalpy-entropy diagram, an example being biphenyl is very satisfactorily employed as the high temperature fluid in a binary system in which steam or water are used as the lower temperature fluid. In unusual circumstances such as regions in which the ambient temperature is very low such as in arctic regions, a third, still lower working fluid such as one of the Freons may also be employed. In such binary, ternary or higher systems, the overall temperature range is quite large so that the Carnot as well as the Rankine efficiencies are extremely high. Various fluids of the type characterized above may also be used as mixtures charging directly into the same or different stages of an expansion engine such as a turbine, or may be used as binary fluids such as biphenyl as the high temperature fluid and toluene as the lower temperature fluid. In employing such thermodynamic cycles, the use of intermediate stage heaters, reheaters, economizers and condensers are employed in the usual manner.

In applying the present invention to a reciprocating engine, the supplementary addition of liquid to the initially expanding vapor may be carried out by admitting the liquid into the cylinder at entry ports along the length of the cylinder. Suitable valving and/or timing controls provide the sequence of vapor and liquid charges.

What is claimed is:

1. A method of converting heat into work by employing a working fluid characterized by superheating upon expansion in the vapor state, which comprises expanding in an expansion engine the said fluid in at least partly liquid form to a condition of decreased liquid content to perform useful work.

2. Process as in claim 1 in which the fluid contains oxygen in its molecular structure.

3. Process as in claim 1 in which the fluid contains nitrogen in the molecule.

4. Process as in claim 1 in which the fluid contains sulfur in the molecule.

5. Process as in claim 1 in which the fluid contains a halogen in the molecule.
6. Process as in claim 1 in which the fluid is biphenyl.
7. Process as in claim 1 in which the fluid is toluene.
8. Process as in claim 1 in which the fluid is naphthalene.
9. Process as in claim 1 in which the fluid is terphenyl.
10. Process as in claim 1 in which the fluid is chlorobenzene.
11. Process as in claim 1 in which the fluid is trifluorotoluene.
12. Process as in claim 1 in which the fluid is chlorobiphenyl.
13. Process as in claim 1 in which the fluid is bromobenzene.
14. Process as in claim 1 in which the fluid is pyridene.
15. Process as in claim 1 in which the fluid is phenylpyridene.
16. Process as in claim 1 in which the fluid is thiophene.
17. Process as in claim 1 in which the fluid is thionaphthene.
18. Process as in claim 1 in which the fluid is biphenyl oxide.
19. Process as in claim 1 in which the fluid is benzofuran.
20. Process as in claim 1 in which the fluid is quinoline.
21. A method for converting heat energy into work by expanding a working fluid in a turbine of at least two stages with mixing chambers between at least two stages, the said fluid being characterized by superheating upon expansion in the vapor state, which comprises expanding a first charge, at least partly in the liquid phase, of the said fluid through at least one stage of the said turbine, passing the expanded first charge to the said mixing chamber, injecting into the mixing chamber an additional charge of the said fluid, being at least partly in the liquid phase, whereby the injected charge mixes with the first expanded charge, and then expanding the mixture in at least one further turbine stage to do useful work.
22. A method of expanding a fluid characterized by superheating upon expansion in the vapor state, which comprises expanding a first charge of the said fluid which is at least partly in the liquid state, and during the expansion of said first charge, adding at least one charge of a fluid which is at least partly in the liquid state, and which is characterized by superheating upon expansion in the vapor state, and expanding the said second fluid, the said expansion occurring substantially along the saturated vapor line of the entropy-enthalpy diagram.
23. A method of converting heat into work which includes employing fluid characterized by superheating upon expansion in the vapor state, raising the temperature of the said fluid to substantially its boiling point, expanding the said fluid in at least partly liquid form in an expansion engine, to substantially the saturated vapor state, utilizing the expansion of the said fluid to perform useful work, and condensing the expanded fluid to a liquid.
24. A method of converting heat into work, which comprises heating a fluid to at least its boiling point, the said fluid being characterized in having a saturated vapor line of positive slope on the entropy-enthalpy diagram, introducing a liquid form of the aforesaid heated fluid in an expansion engine and expanding the said fluid to substantially the saturated vapor form, and withdrawing the said fluid as a vapor from the said expansion engine.
25. A method of converting heat into work, which comprises heating a fluid to at least its boiling point, the said fluid being characterized by superheating upon expansion in the vapor state, introducing the aforesaid heated fluid in at least partly liquid form in an expansion engine, expanding the said fluid to substantially the saturated vapor state, further expanding the said vapor with a gain in superheat, withdrawing the said fluid as a vapor from the said expansion engine, condensing the vapor to a liquid, and repeating the cycle.
26. A method of converting heat into work by the expansion of a fluid characterized in superheating upon expansion in the vapor state, which comprises introducing the aforesaid fluid in heated, liquid state in an expansion engine, expanding the said liquid to substantially the saturated vapor state, and expanding the said vapor with a gain in superheat, introducing into the said expansion engine additional quantities of another fluid characterized in superheating upon expansion in the vapor state, said additional fluid being at least partly in the liquid state, and substantially completely vaporizing the said added fluid in the presence of the first quantity of the first said expanded fluid.
27. A method of converting heat into work by the expansion of a fluid characterized in superheating upon expansion in the vapor state, which comprises introducing the aforesaid fluid in heated, liquid state in an expansion engine, expanding the said liquid to substantially the saturated vapor state, and expanding the said vapor with a gain in superheat, introducing into the said expansion engine additional quantities of another heated fluid characterized in superheating upon expansion in the vapor state, said additional fluid being at least partly in the liquid state, and substantially completely vaporizing the said added fluid in the presence of the first quantity of the first said expanded fluid, and thereafter condensing the vapor admixture of the first and second fluids.

References Cited by the Examiner

UNITED STATES PATENTS

| | | | |
|---|---|---|---|
| 1,625,263 | 4/1927 | Losel | 253—69 |
| 1,961,784 | 6/1934 | Roe | 60—38 |
| 1,961,785 | 6/1934 | Roe | 60—38 |
| 2,301,404 | 11/1942 | Holmes | 60—36 |
| 2,857,133 | 10/1958 | Burke et al. | 253—39.15 |
| 3,040,528 | 6/1962 | Tabor et al. | 60—36 |

FOREIGN PATENTS 280,926  9/1928  Great Britain.

OTHER REFERENCES

Findlay, W. S.: "Diphenyl Heat-Engine Cycles," Power Engineer, March 1934, pp. 89–91.

MARK NEWMAN, *Primary Examiner.*

JULIUS E. WEST, SAMUEL LEVINE, *Examiners.*